United States Patent
Nakamura et al.

(10) Patent No.: US 8,669,996 B2
(45) Date of Patent: Mar. 11, 2014

(54) IMAGE PROCESSING DEVICE AND IMAGE PROCESSING METHOD

(75) Inventors: Sensaburo Nakamura, Shizuoka (JP); Norimasa Ozaki, Kanagawa (JP); Takeo Ugai, Kanagawa (JP); Toshimasa Kakihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/832,278

(22) Filed: Jul. 8, 2010

(65) Prior Publication Data
US 2011/0012914 A1    Jan. 20, 2011

(30) Foreign Application Priority Data

Jul. 14, 2009   (JP) ................................ P2009-166178

(51) Int. Cl.
*G09G 5/00* (2006.01)

(52) U.S. Cl.
USPC ........... 345/582; 345/581; 345/619; 345/649; 345/660; 345/672; 345/473; 345/474

(58) Field of Classification Search
None
See application file for complete search history.

(56) References Cited

U.S. PATENT DOCUMENTS 6,384,834 B1 * 5/2002 Watanabe ...................... 345/582
6,816,164 B2 * 11/2004 Takata .......................... 345/552
7,307,638 B2 * 12/2007 Leather et al. ................. 345/582

FOREIGN PATENT DOCUMENTS

JP       7 57118       3/1995
JP       11 53573      2/1999

* cited by examiner

*Primary Examiner* — Antonio A Caschera
(74) *Attorney, Agent, or Firm* — Sony Corporation

(57) ABSTRACT

An image processing device includes an image generation unit generating a computer graphics image on the basis of computer graphics description data, an image mapping unit texture-mapping an input image to a surface of a computer graphics object drawn by the image generation unit, and a coordinate setting unit undergoing a change manipulation of a texture coordinate and storing contents of the change manipulation, in which the image mapping unit performs texture mapping by a text coordinate which is changed on the basis of contents of the change manipulation which are stored in the coordinate setting unit when texture-mapping the input image to the surface of an object.

10 Claims, 16 Drawing Sheets

FIG. 2

KIND EXAMPLE: phong

| PARAMETER | VALUE | MEANING |
|---|---|---|
| <emission> | COLOR | AMOUNT OF LIGHT ILLUMINATED FROM A LIGHT SOURCE |
| <ambient> | COLOR | AMOUNT OF AMBIENT ILLUMINATION |
| <diffuse> | COLOR | AMOUNT OF DIFFUSED LIGHT WHICH IS REFLECTED |
| <specular> | COLOR | AMOUNT OF SPECULARLY REFLECTED LIGHT |
| <shininess> | NUMERICAL VALUE | SPECULAR REFLECTIVE PROTRUSION |
| <reflective> | COLOR | PERFECT SPECULAR REFLECTION |
| <reflectivity> | NUMERICAL VALUE | ADDITIONAL LIGHT AMOUNT OF PERFECT SPECULAR REFLECTION |
| <transparent> | COLOR | COLOR OF PERFECTLY REFRACTED LIGHT |
| <transparency> | NUMERICAL VALUE | ADDITIONAL LIGHT AMOUNT OF PERFECT REFRACTION |

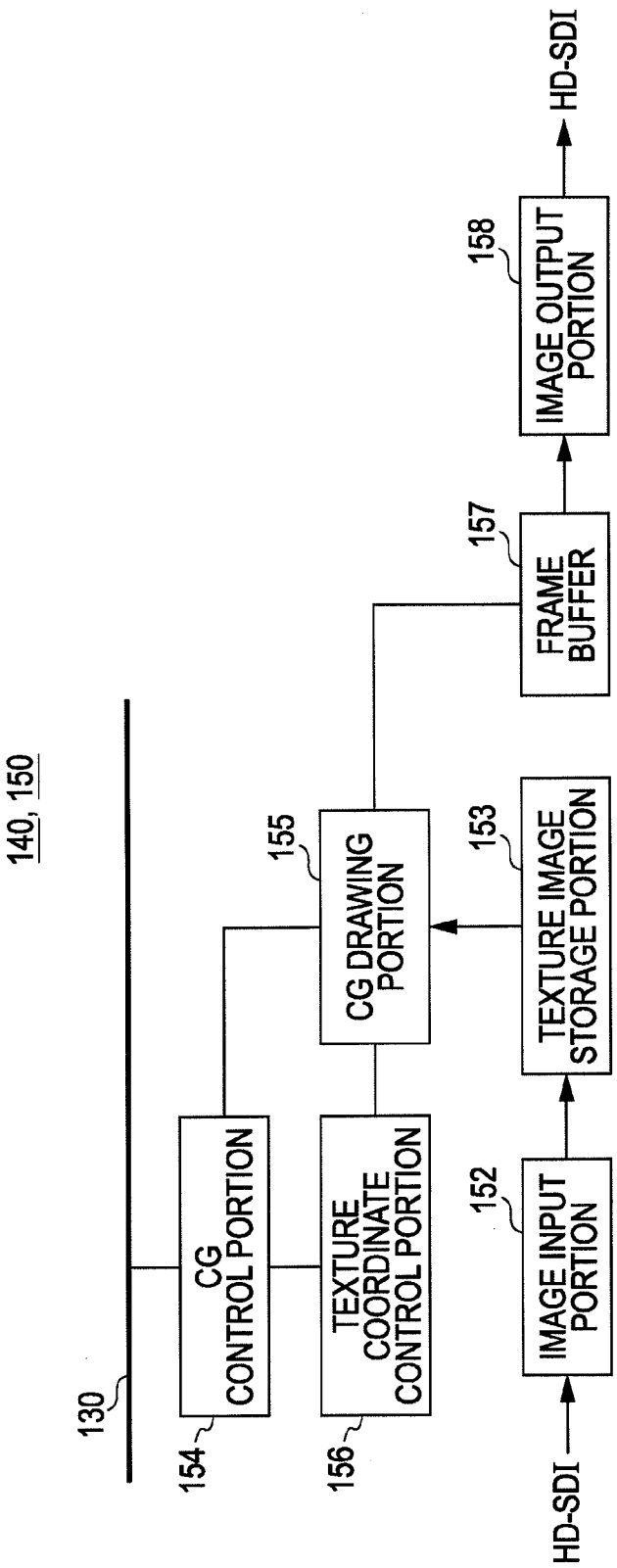

(0, 1)   (1, 1)

(0, 0)   (1, 0)

PICTURE FRAME u2 = 0.4×u1 + 0.3
v2 = 0.4×v1 + 0.3

PICTURE FRAME

PICTURE FRAME u2 = u1 + 0.5
v2 = v1

IMAGE PROCESSING DEVICE AND IMAGE PROCESSING METHOD

BACKGROUND OF THE INVENTION

1. Field of the Invention

The present invention relates to an image processing device and an image processing method, and in particular to an image processing device performing image synthesis by texture-mapping an image based on image data to a computer graphics image.

2. Description of the Related Art

In the three-dimensional graphics system, three-dimensional coordinates are resolved into polygons such as triangles, and the whole picture is drawn by drawing the polygons. Therefore, in such a case, it can be said that a three-dimensional image is defined by combination of polygons. The surfaces of many objects around people typically have repetitive patterns of complex shapes. As the shape and pattern become more complex and smaller, it becomes difficult to model each shape or pattern by triangles. So a texture mapping is employed as the means to solve this problem.

A texture mapping is to achieve an image with high realism by pasting image data taken from a scanner or the like to the surface of an object with the use of a smaller number of vertexes. The texture mapping defines mapping to a texture coordinate system from an object coordinate system, obtains mapping to the texture coordinate system from a window coordinate system, and obtains texels (texture cell elements which are elements of a texture) corresponding to pixels (picture cell elements) in the window coordinate system, respectively.

The image data used for a texture is stored in a memory region called a texture memory. Therefore the texture mapping processing for a moving image can be realized by performing processing of updating the texture memory at any time with the use of moving image data.

For example, Japanese Unexamined Patent Application No. 11/053573 discloses a three-dimensional image processing device which achieves texture mapping by processing a moving image. Japanese Unexamined Patent Application No. 07/057118 discloses an image generation device which achieves texture mapping to an intended shape by interactively specifying vertexes of a computer graphics (CG) object and specifying a texture coordinate or the like.

SUMMARY OF THE INVENTION

Computer graphics (CG) description data is produced by professional CG designers. A plurality of CG objects is arranged in the virtual three-dimensional space, and the surface attributes thereof are defined as a material. Even in the case of texture-mapping a moving image, it was not possible to work viewing the texture-mapped image of the moving image to be broadcasted during the CG production process. In addition, the produced CGs may be sometimes an animation.

How the texture-mapped surface looks changes depending on arrangement of a CG object and movement of an animation. On the other hand, the attached image may not be checked by the time of use. Accordingly, it is difficult to produce the CG, considering the final whole image.

A technique of texture-mapping a still image primarily aims at expression of the characteristics of the surface of a CG object (virtual object). For example it can be used to leave grains of wood or shape of tiles on the surface. So a still image is displayed by performing mapping, matching with the shape of the object. However, it is very different when it comes to the texture mapping of a moving image. The texture mapping is used as one of special effects of the moving images. In the case of grains of wood or the like, it follows the movement of the CG object. So, it is sufficient to express the surface of an object without considering the top and bottom of a screen. However, in the case of the moving image, it is more desired that the displayed state of the moving image meets the intention of a manipulator than the object.

For example, in the case of a CG image of a stump, it is natural that annual rings appear on the surface of the stump. So a still image obtained by imaging annual rings is texture-mapped to the surface, and the still image is arranged such that the center of the ring of the annual ring comes to the center of the stump and rings look natural by matching them with the form of the peripheral contour of the stump (a natural tree is not a perfect circle but has unevenness as the peripheral contour thereof). That is, by setting the texture coordinate (UV coordinate) in such a way, positional and directional alignments are performed. The texture coordinate set in this way is correlated with the surface of the stump and is described in the CG description data.

When using the CG description data in broadcasting, the produced CG image of the stump is sometimes broadcasted as it is, but there is also a case in which a live moving image, for example, the performer's facial image is texture-mapped to the surface of the stump. That is, the identical CG description data will be used for two or more purposes.

The texture coordinates which are correlated with the surface of the stump are set such that the image of the annual rings look natural. If the moving image is texture-mapped, there is a possibility that the vertical direction of the moving image, for example, the vertical direction of the performer's facial image directs in an unnatural direction by the texture coordinates set due to the annual ring. Or, there is a possibility that the facial image is cut off or divided as the middle portion of the facial image comes to the edge of the stump. Therefore, owing to such problems, the identical CG description data has not be used for two purposes so far. FIGS. 18A and 18B illustrate examples in which the texture-mapped image (coffee cup) directs in an unnatural direction due to the rotation of the object.

It is desirable to provide an image processing device which allows a manipulator to acquire the result of a texture mapping of a moving image in response to his or her intention when using a produced CG for live broadcasting.

An image processing device according to an embodiment of the present invention includes an image generation unit which generates a computer graphics image on the basis of computer graphics description data, an image mapping unit which texture-maps an input image to the front surface of a computer graphics object drawn by the image generation unit, and a coordinate setting unit which receives change manipulation of a texture coordinate and stores contents of the change manipulation, in which the image mapping unit performs a texture mapping with the use of the texture coordinate which is changed on the basis of the change manipulation stored in the coordinate setting unit when texture-mapping the input image to the surface of an object.

In the image processing device, the image generation unit generates the computer graphics image on the basis of the computer graphics description data. In this case, a three-dimensional coordinate is resolved into polygons such as triangles and the whole image is drawn by drawing the polygons. Further, the input image is texture-mapped to the surface of a computer graphics object, which is drawn by the image generation unit, by the image mapping unit.

The change manipulation of the texture coordinate is accepted by the coordinate setting unit and the contents of the change manipulation are stored. In the image mapping unit, when texture-mapping the input image to the surface of an object, the texture mapping is performed by the texture coordinate which is changed on the basis of the change manipulation stored in the coordinate setting unit. The processing (changing processing) of changing the texture coordinate on the basis of the contents of the change manipulation is performed by the coordinate setting unit or the image mapping unit.

In this way, when the input image is texture-mapped to the surface of an object, the texture mapping is performed by the texture coordinate which is changed on the basis of the contents of the change manipulation of texture coordinate. Therefore, a manipulator can obtain the result of the texture mapping of the input image as he or she intends. Further, both a CG obtained by texture-mapping a still picture at the time of CG production and a CG obtained by texture-mapping an input image (moving image) at the time of use can be used and it is possible to obtain plural results by production of a single CG. Accordingly, efficiency of the CG production is increased.

For example, in a coordinate setting unit, specification of a rotation angle of the input image to be texture-mapped to the surface of an object is accepted and the contents of specification of the rotation angle is stored. In the image mapping unit, when texture-mapping the input image to the surface of an object, the texture mapping is performed by the texture coordinate which is changed such that the input image texture-mapped to the surface of an object becomes the specified rotation angle state. In this case, the input image texture-mapped to the surface of an object comes to be rotated by the specified rotation angle, for example, comes to an erect state.

For example, when the computer graphics description data contains an animation, the specified rotation angle received by the coordinate setting unit becomes the rotation angle of the input image texture-mapped to the surface of an object at a predetermined frame within an animation. For this instance, the input image texture-mapped to the surface of an object at the predetermined frame within the animation becomes the specified rotation angle state, for example, the erect state.

For example, specification of zooming of the input image to be texture-mapped to the surface of an object is received and the contents of the specification of zooming are stored by the coordinate setting unit. In the image mapping unit, when the input image is texture-mapped to the surface of an object, the texture mapping is performed by the texture coordinate which is changed such that the input image texture-mapped to the surface of an object becomes the specified zoomed state. In this case, the input image texture-mapped to the surface of an object becomes the specified zoomed state.

For example, specification of shift of the input image texture-mapped to the surface of an object is accepted, and contents of the specification of shift are stored by the coordinate setting unit. In the image mapping unit, when the input image is texture-mapped to the surface of an object, the texture mapping is performed by the texture coordinate which is changed such that the input image texture-mapped to the surface of an object becomes the specified shifted state. In this case, the input image texture-mapped to the surface of an object becomes the specified shifted state.

According to some embodiments of the invention, when the input image is texture-mapped to the surface of an object, the texture mapping is performed by the texture coordinate which is changed on the basis of the contents of the change manipulation of the texture coordinate. The result of the texture mapping of the moving image becomes the state intended by the manipulator.

BRIEF DESCRIPTION OF THE DRAWING

FIG. 2 is a diagram illustrating an example of surface information of a material.

FIG. 5 is a diagram illustrating an example of functional blocks of the image generation unit and the image mapping unit.

DESCRIPTION OF THE PREFERRED EMBODIMENTS

Hereinafter, forms for implementing the invention (hereinafter, referred to as "embodiments") will be described. The description will be given in the following order:
1. Embodiment;
2. Modified example.

1. Embodiment

Structure of Image Processing Device

Figure 1:
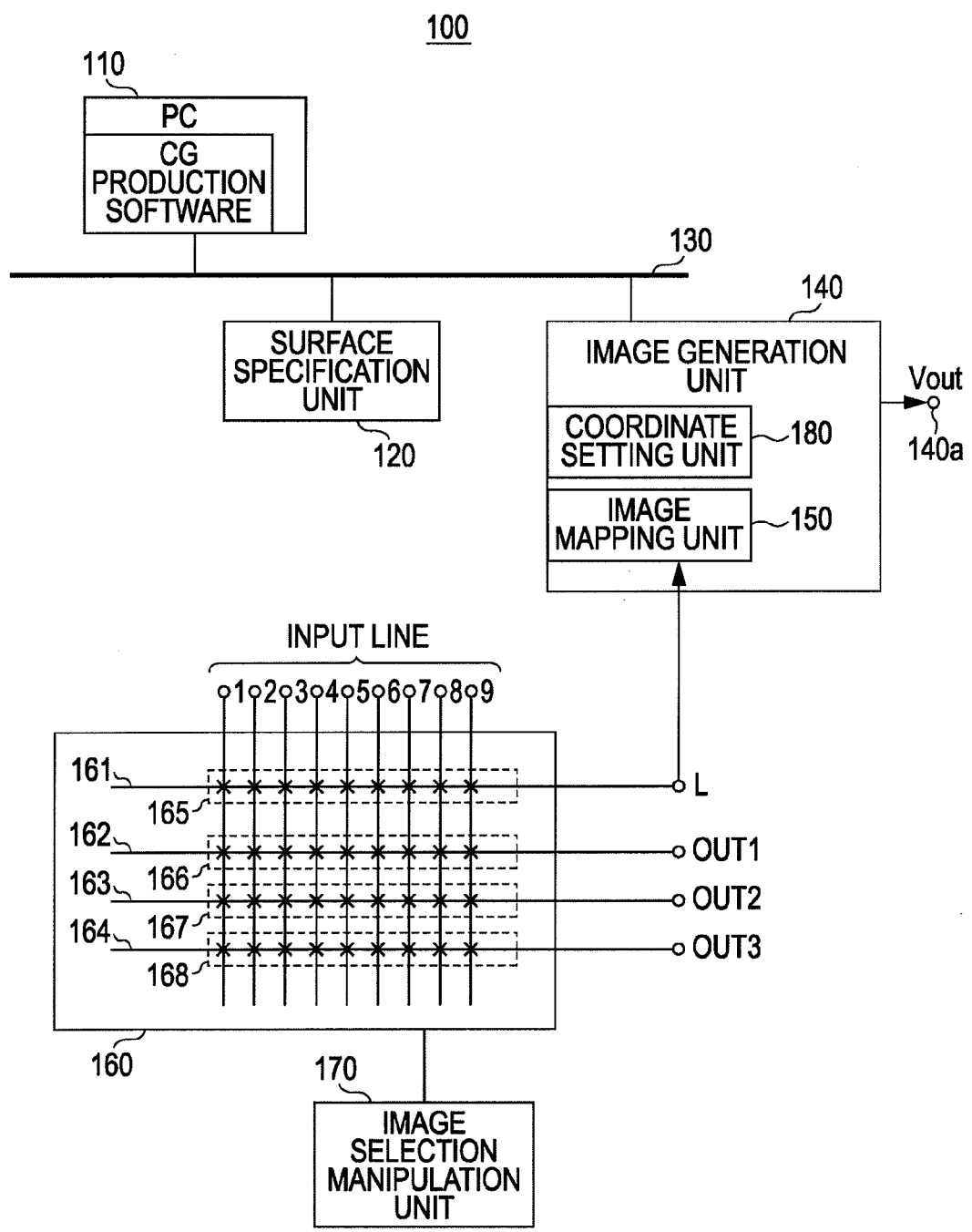
FIG. 1 is a block diagram illustrating an exemplary structure of an image processing device according to one embodiment.

Embodiments of the invention will be described. FIG. 1 illustrates an exemplary structure of an image processing 100 according to one embodiment of the invention. The image processing device 100 includes a computer graphics (CG) production unit 110, a surface specification unit 120, a network 130, an image generation unit 140, and an image mapping unit 150. The image processing device 100 further includes a matrix switch 160 and an image selection manipulation unit 170. The CG production unit 110, the surface specification unit 120, and the image generation unit 140 are connected respectively to the network 130.

The CG production unit 110 is constituted by a personal computer (PC) with CG production software. The CG production unit 110 outputs the CG description data having a predetermined format. An exemplary format of the CG description data is Collada (Registered trademark). Collada is the description definition to achieve an exchange of three-dimensional CG data in Extensible Markup Language (XML). For example, the following information is written in the CG description data.

(a) Definition of Material

A definition of the term "material" is the quality of the surface of the CG object (how it looks). The definition of the material contains information on color, way of reflection, light emission, and unevenness or the like. The definition of the material sometimes contains information on the texture mapping. As described above, the texture mapping is a skill to paste an image to a CG object and can express a complex shape, reducing the load of a processing system relatively. FIG. 2 illustrates an example of the surface information of the material. In addition, the texture mapping is sometimes specified instead of the color.

(b) Definition of Geometric Information "Geometry"

A definition of geometric information "Geometry" contains information on position and vertex coordinates about a polygon mesh.

(c) Definition of Camera

A definition of a camera contains parameters of a camera.

(d) Definition of Animation

A definition of an animation contains information of various values at each key frame of an animation. For example, the definition of the animation contains information on time of each key frame of the animation. The information of various values means, for example, time of a key frame of the corresponding object (node), a position and vertex coordinate, a size, a tangent vector, an interpolation method and information on changes or the like in various kinds of information in the animation.

(e) Position, Direction, Size, Definition of Corresponding Geometric Information, and Definition of a Corresponding Material of a Node (Object) in a Scene.

These kinds of information are not dispersive but, for example, correlate with one another as follows:
Node . . . Geometric information;
Node . . . Material (plural);
Geometric information . . . Polygon set(plural);
Polygon set . . . Material (one of many corresponding to a node); and
Animation . . . Node.

Description constituting a single screen is called a description sheet. Each definition is called library and referred inside a scene. For example, in the case in which there are two rectangular parallelepiped objects, each is described as one node, and one in the definition of the material is associated with each node. As a result, the material definition is associated with each rectangular parallelepiped object. Color and characteristics of reflection are drawn in response to each material definition.

Or when the rectangular parallelepiped object is described with a plurality of polygon sets and the polygon sets are associated with the material definitions, the drawing is conducted by different material definitions for every polygon set. For example, when the number of sides of a rectangular parallelepiped object is 6, the rectangular parallelepiped object is sometimes described with three polygon sets composed of, for example, one polygon set with 3 sides, another polygon set with two sides, and the other polygon set with one side. Since the polygon sets can be associated with different material definitions, it is possible to draw the object such that every side of the object has a different color.

When the texture mapping is specified in the material definition, an image based on image data is texture-mapped to the associated surface of the object.

According to the embodiment, as it is described later, for example, it is set such that the input image is texture-mapped for material definition. Therefore it is possible to texture-map all the sides of the rectangular parallelepiped object with the identical input image or alternatively with different input images respectively.

A sample (excerpt example) of a Collada file serving as the CG description data is illustrated in the appendix and is to be referenced for the following description. For example, in the sample, the material with the name (value) "01MatDefault" is defined. Further, it is described that the actual contents of the material should refer to the effect "01MatDefault-fx". In the sample, it is described that drawing is conducted by correlating the material definition of "01MatDefault" with the geometric information definition of "#Box01-lib" in <library_visual_scenes>.

Returning to FIG. 1, the matrix switch 160 constitutes an image selection unit which selectively takes out a single piece of image data from plural pieces of input image data. The matrix switch 160 is composed of 9 input lines, four output bus lines 161 to 164, and cross point switch groups 165 to 168.

The 9 input lines are arranged in one direction in the figure. Each of the 9 input lines is supplied with image data from VTRs and video cameras, and the like. The 4 output bus lines 161 to 164 are arranged in a different direction so as to intersect with the input lines. The cross point switch group 165 is connected to the 9 input lines and the output line 161 at crossing points of the 9 input lines and the output line 161. The cross point switch group 165 is controlled on the basis of the user's image selection manipulation, and one of the pieces of image data input to the 9 input lines is selectively output to output bus line 161. The output bus line 161 constitutes an output line of the image data L for the texture mapping.

The cross point switch group 166, 167, and 168 are respectively connected at each crossing point where the 9 input lines and the output bus lines 162, 163, and 164 intersect. This cross point switch group 166, 167, and 168 are controlled on the basis of the user's image selection manipulation, and any piece of the image data input to the 9 input lines are selectively output to the output bus lines 162,163, and 164. The output bus lines 162, 163, and 164 serve as output lines of image data OUT1, OUT2, and OUT3 for external output, respectively.

ON/OFF operation of each of the cross point switch groups 165 to 168 is performed in a vertical blanking region which is a cut line of frames to exchange the image data which is the series of frame data.

The image selection manipulation unit 170 receives a manipulation of an instruction to the matrix switch 160. The image selection manipulation unit 170 is composed of push button lines corresponding to the output bus lines, respectively and respective buttons are made to correspond to respective input lines.

Figure 3:
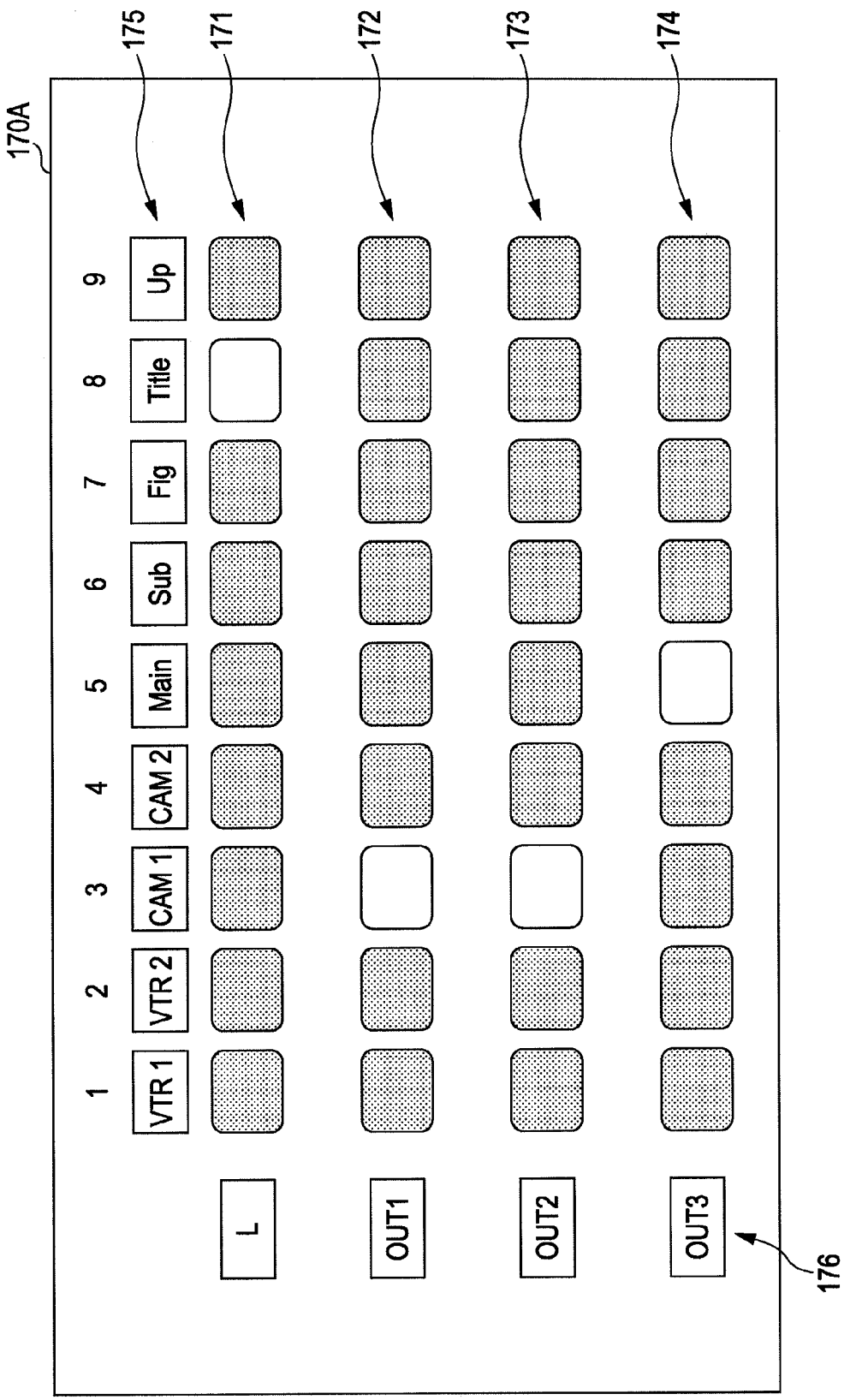
FIG. 3 is a diagram illustrating an example of appearance of a control panel serving as an image selection manipulation unit.

FIG. 3 illustrates an example of the appearance of the control panel 170A which constitutes the image selection manipulation unit 170. The control panel 170A is provided with push button lines 171 to 174 which correspond to the output bus lines 161 to 164, respectively. The push button lines 171 to 174 extend in the left and right direction and line up in the top and bottom direction. Each push button line is composed of push buttons of an alternative system by which one connection with the output bus line which corresponds to one of the input lines is selected, and the selected push button lights up.

An upper portion of the control panel 170A is provided with a character display portion 175, and the characters to identify an input image to be input to each input line are displayed in the character display portion 175. A left portion of the control panel 170A is provided with a character display portion 176 and characters to identify the image data to be output to the output bus lines corresponding to the push button lines are displayed in the character display portion 176.

Returning to FIG. 1, the image generation unit 140 generates the CG image which is a three-dimensional space image on the basis of the CG description data produced by the CG production unit 110. The image generation unit 140 generates images of animation frames in real time not by the rendering processing which takes time.

The image generation unit 140 stores information on each definition in the memory and correlations thereof as a data structure upon reading the CG description data. The image generation unit 140 stores all kinds of values of the key frame to carry out the animation in the memory.

For example when drawing the polygon set which is present in the geometric information of a certain node, the polygon set is drawn in response to the specification such as the color by referring to the geometric information and the correlated material definition. In the case of an animation, the drawing is performed by progressing the current time for each frame, and determining all values of the previous and subsequent key frames of the current time by interpolation.

Specification information on the object, by which the texture mapping of the input image is performed, is sent to the image generation unit 140 from the surface specification unit 120. The image generation unit 140 controls the image mapping unit 150 in a manner such that the input image is texture-mapped to the surface of an object indicated by the specification information.

The image mapping unit 150 texture-maps the input image to the surface of an object which is a texture mapping object specified by the surface specification unit 120 among the CGs drawn by the image generation unit 140. The image mapping unit 150 is integrally formed with the image generation unit 140 in practice. The image mapping unit 150 is achieved by control by software on a central processing unit (CPU) and operation by hardware of a graphics processing unit (GPU) or the like. Control software specifies the polygon set to be texture-mapped and makes an instruction to the hardware.

Structural Example of Image Generation Unit and Image Mapping Unit

Figure 4:
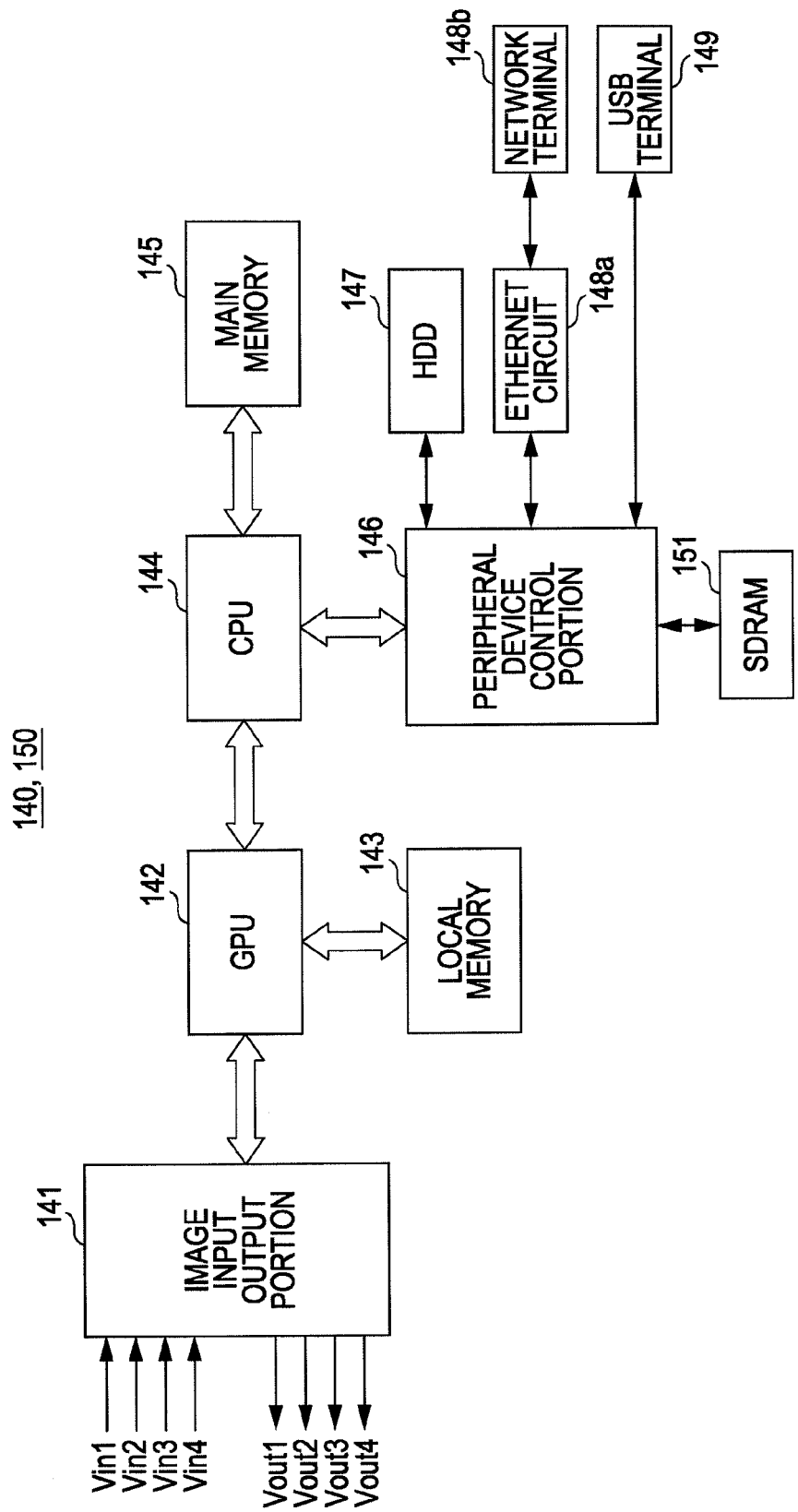
FIG. 4 is a block diagram illustrating a detailed exemplary structure of an image generation unit and an image mapping unit.

FIG. 4 illustrates a concrete structural example of the image generation unit 140 and the image mapping unit 150. The image generation unit 140 and image mapping unit 150 have an image input output portion 141, a GPU 142, a local memory 143, a CPU 144, and a main memory 145. In addition, the image generation unit 140 and the image mapping unit 150 further have a peripheral device control portion 146, a hard disk drive (HDD) 147, an Ethernet circuit 148a, and a network terminal 148b. In addition, the image generation unit 140 and the image mapping unit 150 further have a Universal Serial Bus (USB) terminal 149 and a Synchronous DRAM (SDRAM) 151. The term "Ethernet" is a registered trademark.

The image input output portion 141 inputs image data to be used in texture mapping, and outputs image data of a CG image to which the image based on the image data is appropriately texture-mapped. The image input output portion 141 can input the image data of four systems at maximum and can also output the image data of four systems at maximum. In addition, for example, the image data mentioned here is image data based on HD-SDI (High Definition television-SerialDigital Interface) standard prescribed in SMPTE292M. The GPU 142 and the main memory 145 are made to be equally accessible to the image input output portion 141.

The main memory 145 functions as a working area of the CPU 144 and temporarily stores the image data input from the image input output portion 141. The CPU 144 controls the whole image generation unit 140 and the whole image mapping unit 150. The CPU 144 is connected to the peripheral device control portion 146. The peripheral device control portion 146 performs interfacing processing between the CPU 144 and the peripheral devices.

The CPU 144 is connected to the built-in hard disk drive 147 via the peripheral device control portion 146. In addition, the CPU 144 is connected to the network terminal 148b via the peripheral device control portion 146 and the Ethernet circuit 148a. In addition, the CPU 144 is connected to the USB terminal 149 via the peripheral device control portion 146. Furthermore, the CPU 144 is connected to the SDRAM 151 via the peripheral device control portion 146.

The CPU 144 controls the texture coordinate. In other words the CPU 144 performs processing of texture-mapping the image based on the input image data to the surface of the polygon drawn by the GPU 142. The GPU 142 generates a CG image on the basis of the CG description data stored in the hard disk drive 147 or the like, and texture-maps the input image onto the surface of the specified polygon if necessary. The local memory 143 functions as the working area of the GPU 142 and temporarily stores the image data of the CG image made by the GPU 142.

The CPU 144 can access the local memory 143 as well as the main memory 145. Likewise, the GPU 142 can access the local memory 143 and the main memory 145. The CG image data generated by the GPU 142 and primarily stored in the local memory 143 is sequentially read from the local memory 143 and output from the image input output portion 141.

FIG. 5 illustrates a structural example of functional blocks of the image generation unit 140 and the image mapping unit 150. This image generation unit 140 and the image mapping unit 150 have function blocks of an image input portion 152, a texture image storage portion 153, a CG control portion 154, a CG drawing portion 155, a texture coordinate control portion 156, a frame buffer 157 and an image output portion 158.

The image input portion 152 and the image output portion 158 are constituted by the image input output portion 141. In addition, the texture image storage portion 153 is constituted by the main memory 145. In addition, the CG control portion 154 and the texture coordinate control portion 156 are constituted by the CPU 144. In addition, the CG drawing portion 155 is constituted by the GPU 142. In addition, the frame buffer 157 is constituted by the local memory 143.

The image input portion 152 and the texture image storage portion 153 make a pair. By increasing the number of pairs of the image input portion 152 and the texture image storage portion 153, it is possible to increase the number of image input systems. In addition, the frame buffer 157 and the image output portion 158 make a pair. By increasing the number of pairs of the frame buffer 157 and the image output portion 158, it is possible to increase the number of image output systems.

Figure 6A:
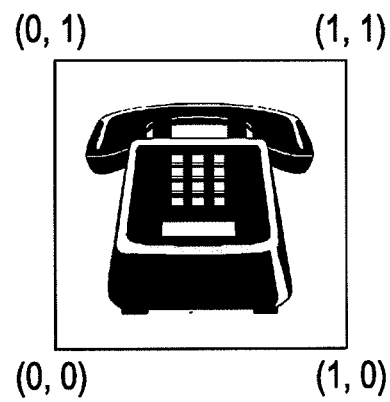
FIGS. 6A, 6B, and 6C are diagrams for explaining the principle of texture mapping.
Figure 6B:
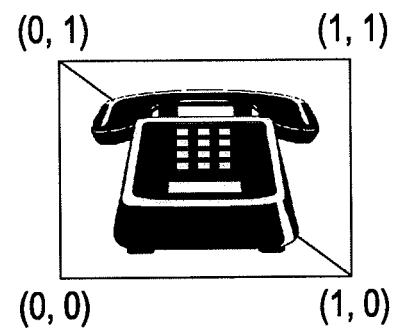
Figure 6C:
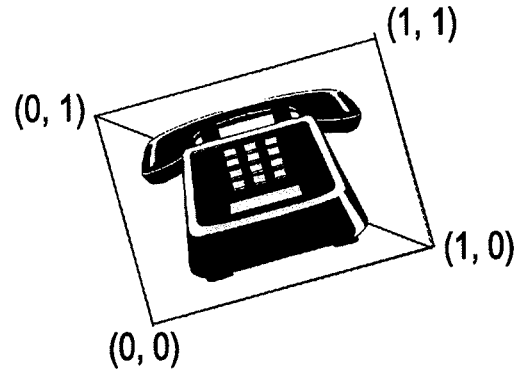

Here, principles of the texture mapping can be understood with reference to FIGS. 6A and 6B. As illustrated in FIG. 6A, as for the image (even a moving image) for texture mapping, U, V coordinates (texture coordinates) with a value in the range of 0 to 1, are correlated. FIG. 6B illustrates a texture-mapped image obtained by setting values of the U, V coordinates to the illustrated respective vertexes of a rectangle formed by combining two polygons of right-angled triangles. In this case, the image is shrunk in the vertical direction. FIG. 6C illustrates the rotated state of the above image. Even if the polygon is rotated, the image is sticking to the polygon.

Returning to FIG. 1, the surface specification unit 120, as described above, specifies the texture mapping object to which the input image is texture-mapped. The surface specification unit 120 sends specification information to the image generation unit 140 via the network 130. For example, the surface specification unit 120 is achieved by a Graphical User Interface (GUI).

For example, the surface specification unit 120 displays the values (names) of predetermined attributes given to the objects of the CG description data as a choice, and allows a manipulator choose the object which is a texture mapping object by allowing the manipulator to choose one. The surface specification unit 120 sends the value of the chosen attribute to the image generation unit 140 as the specification information of the object for the texture mapping. Here, the predetermined attribute is the material definition or the surface information or the like possessed by the material definition.

The coordinate setting unit 180 receives a change manipulation of the texture coordinate and stores contents of the change manipulation. The coordinate setting unit 180 is integrally formed with the image generation unit 140 in terms of mounting. When texture-mapping the input image onto the surface of an object which is a texture mapping object, the image mapping unit 150 performs the texture mapping by the texture coordinate which is changed on the basis of the contents of the change manipulation stored by the coordinate setting unit 180.

The manipulator performs a specification input to specify how to change the texture mapping image (input image) with respect to the coordinate setting unit 180. The manipulator performs the specification input in the state in which the texture mapping object is particularly specified. The coordinate setting unit 180 stores the specification input as the contents of the change manipulation.

For example, the manipulator can perform the specification input at the time of CG production. In that case, a CG designer (the manipulator at the time of CG production) will produce the CG by considering both cases in which the input image is texture-mapped and in which the input image is not texture-mapped. The manipulator can perform the specification input at the time of use after the image generation unit 140 has received the CG description data from the CG production unit 110. In that case, the manipulator will decide how to perform the texture mapping of the input image at the time of use. At all events the coordinate setting unit 180 stores the specification input for the corresponding CG description data.

Example of Specification Input and Example of Change of Texture Coordinate

The example of the specification input and example of the change of the texture coordinate will be described.

(A) Zooming Specification

The case in which the coordinate setting unit 180 receives zooming specification of the input image to be texture-mapped to the surface of an object, and stores contents of the zooming specification will be described.

U and V of the texture coordinate are respectively in the range of 0 to 1. By fully mapping this range to the object surface, it is possible to display the entire area of x, y of the image. In the case of trying to enlarge the image, a smaller range of U, V, for example, from 0.3 to 0.7 will be texture-mapped to the object surface. As a result, the image is enlarged.

In the case in which it is assumed that original values of U, V of each vertex of the polygon are u1, v1, respectively, new values u2, v2 of U, V are obtained by Expression (1) and Expression (2).

$$u2 = 0.4 \times u1 + 0.3 \qquad (1)$$

$$v2 = 0.4 \times v1 + 0.3 \qquad (2)$$

The coordinate setting unit 180 receives the manipulation input of the values of the range [0.3, 0.7] as the zooming values. The image mapping unit 150 performs the texture mapping after converting the values of U, V of the polygon of the corresponding object surface of the CG description data by Expression (1) and Expression (2).

Figure 7A:
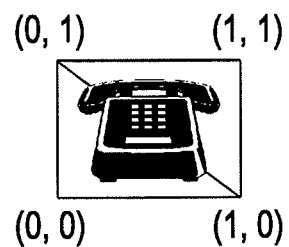
FIGS. 7A and 7B illustrate image mapping states before and after change of a texture coordinate.
Figure 7B:
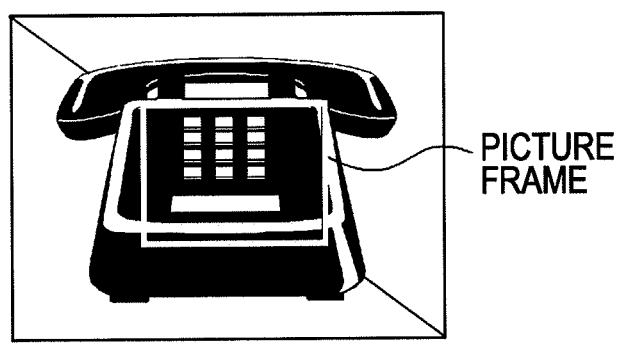

For example, FIGS. 7A and 7B illustrate the image mapping state before and after the conversion of the texture coordinate. FIG. 7A illustrates the image texture-mapped to a rectangle formed by combining two right-angled triangle polygon when there is no conversion of the texture image. In contrast, FIG. 7B illustrates the zoomed state in which only the image inside an image frame is mapped after the conversion of the texture image.

When Expression (1) and Expression (2) are generalized with [a, b] as the range, they become Expression (3) and Expression (4), respectively.

$$u2 = (b-a) \times u1 + a \qquad (3)$$

$$v2 = (b-a) \times v1 + a \qquad (4)$$

If the range is set to [−1, 2] larger than [0, 1], the image comes to shrink. For the values exceeding [0, 1], either no display or a repetitive display can be selectively specified as operation of the texture mapping. In the repetitive display, the range of [1, 2] is treated like the range [0, 1].

Figure 8A:
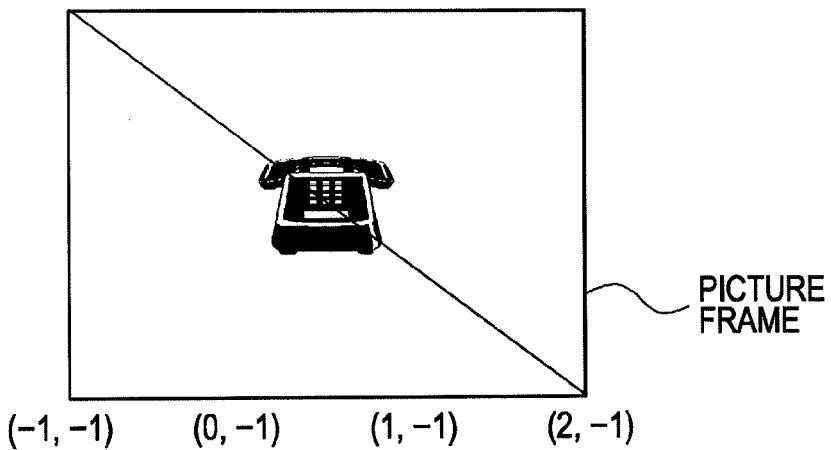
FIGS. 8A and 8B illustrate exemplary image mapping states in the case of values exceeding [0, 1] when specification of zooming is reduced.
Figure 8B:
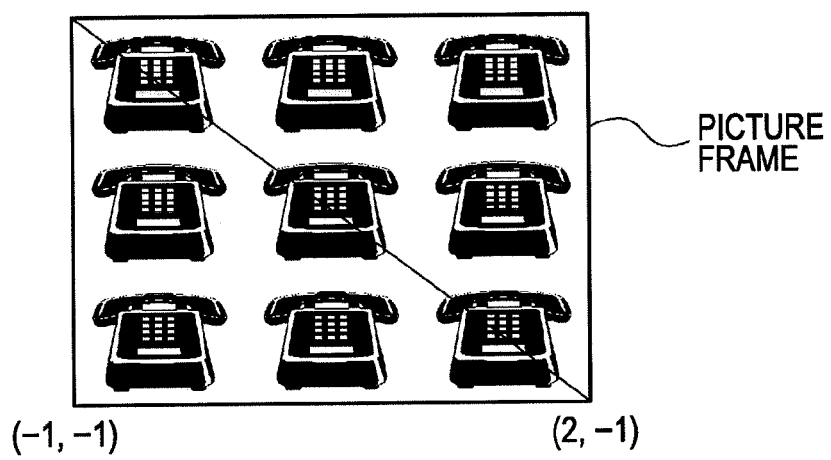

FIGS. 8A and 8B illustrate exemplary image mapping states for the values exceeding [0,1]. FIG. 8A illustrates the case in which no display is selected and specified. In this case, nothing is displayed for the values exceeding [0, 1]. FIG. 8B illustrates the case in which the repetitive display is selected. In this case, the repetitive display is performed for the value exceeding [0, 1].

In this way, the manipulator can enlarge or shrink the image texture-mapped to the surface of the CG object by specifying the display range [a, b].

(B) Shift Specification

The case in which the coordinate setting unit 180 receives the shift specification of the input image texture-mapped to the surface of an object, and stores contents of the shift specification will be described.

It is possible to display the entire area of x, y of the image by fully mapping the range to the object surface when each of U and V of the texture coordinate is in the range from 0 to 1. On the other hand, in the case of trying to shift the image in the horizontal direction, if U which is 0.3 or more is mapped to the object surface, the image is shifted to the left side by 0.3 as the result of it.

In such a case, if the original U value of each point of the polygon is u1, the new U value, u2, is obtained by Expression (5).

$$u2 = u1 + 0.3 \qquad (5)$$

The coordinate setting unit 180 receives the manipulation input having the value [0.3] as a shift value of the horizontal direction. The image mapping unit 150 performs the texture mapping after converting the U value of the polygon of the corresponding object surface of the CG description data by Expression (5).

If Expression (5) is generalized with [c] as the shift value of the horizontal direction, it becomes Expression (6).

$$u2 = u1 + c \qquad (6)$$

In the case of trying to shift the image in the vertical direction, the image is mapped to the object surface with 0.3 or more as the value of V. As a result, the image is shifted to the bottom side by 0.3. In this case, if it is assumed that the original value of V is v1, the new value v2 of V of each point of the polygon is obtained by Expression (7).

$$v2 = v1 + 0.3 \qquad (7)$$

The coordinate setting unit 180 receives the manipulation input of the value [0, 3] as the shift value of the vertical direction. The image mapping unit 150 performs the texture mapping after converting the V value of the polygon of the corresponding object surface of the CG description data by Expression (7).

If Expression (7) is generalized with [c] as the shift value of the vertical direction, it becomes Expression (8).

$$v2 = v1 + c \qquad (8)$$

Figure 9:
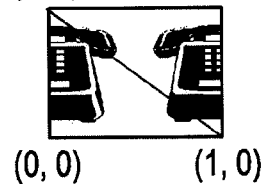
FIG. 9 is an exemplary image mapping state in the case in which values exceed [0, 1] when specifying shift.

In this case, it is usual to specify "repetitive display" for the value exceeding [0, 1]. In other words, in the case of c=0.5, it becomes u2=0.8+0.5=1.3 for the vertex of u1=0.8. However, this is treated like 0.3. FIG. 9 illustrates an exemplary image mapping state for the value exceeding [0, 1]. In this case, u2=u1+0.5 and v2=v1. So, the texture mapping is shifted in the horizontal direction by 0.5.

The manipulator can shift the image texture-mapped to the surface of the CG object in the horizontal direction by specifying the shift value [c] of U. In addition, the manipulator can shift the image texture-mapped to the surface of the CG object in the vertical direction by specifying the shift value [c] of V. In addition, the shift specification can be applied together with above-mentioned zooming specification.

(C) Specification of Rotation Angle

The case in which the coordinate setting unit 180 receives the specification of a rotation angle of the input image texture-mapped to the surface of an object, and stores contents of specification of the rotation angle will be described.

Figure 10A:
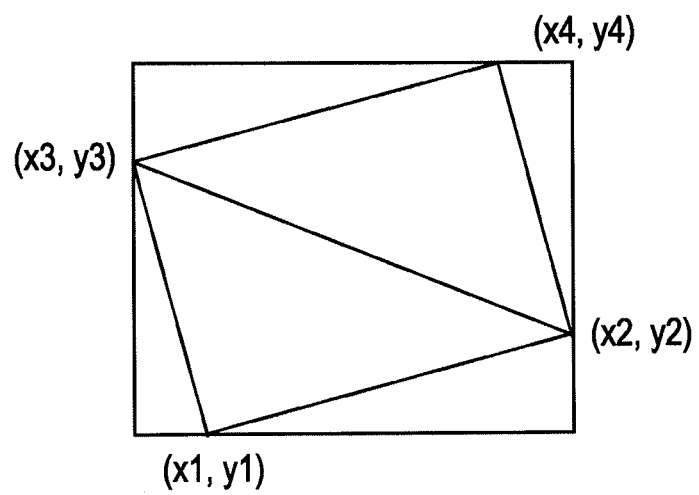
FIGS. 10A and 10B are diagrams for explaining rotation of a texture image.

The object (polygon mesh) in the output CG images is sometimes arranged in the rotated state. Since the texture-mapped image is rotated, it is displayed in the inclined state as illustrated in FIG. 6C and FIG. 10A.

Figure 10B:
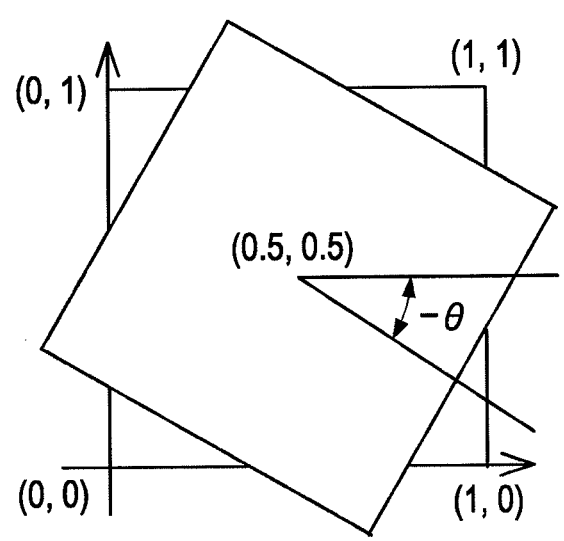

To arrange the texture-mapped image in a rotated state by a predetermined rotation angle, for example, in an erect state, it is necessary to rotate the texture image while maintaining the arrangement of the object. Further, the U, V values of the texture coordinate should be changed by −θ to rotate the paste image which is the result of the texture mapping by the angle θ. For example, as illustrated in FIG. 10B, it is rotated by −θ about (0.5, 0.5) of the texture space. By the way, even though the rotation is possible about any point of the texture coordinate, it is a proper method to rotate the image about the very middle of the original image screen as a pivot point because the center of the image is not displaced.

In this case, when the original U, V values of each point of the polygon is u1, v1, new U, V values u2, v2 are obtained by matrix operation of Expression (9).

$$\begin{pmatrix} u2 \\ v2 \end{pmatrix} = \begin{pmatrix} \cos(-\theta) & -\sin(-\theta) \\ \sin(-\theta) & \cos(-\theta) \end{pmatrix} \begin{pmatrix} u1 - 0.5 \\ v1 - 0.5 \end{pmatrix} + \begin{pmatrix} 0.5 \\ 0.5 \end{pmatrix} \qquad (9)$$

The coordinate setting unit 180 receives the manipulation input for specifying the rotation angle of the image texture-mapped to the surface of the predetermined CG object, for example, specifying the erect posture. The image mapping unit 150 obtains the degree of inclination (−θ) from the texture coordinate and a screen coordinate on the basis of the specification input of the above-mentioned rotation angle, and performs the texture mapping by Expression (9) after converting the U, V values of the polygon of the corresponding object surface of the CG description data. In the manipulation input to obtain the degree of inclination (−θ), the polygon of a triangle constituting the predetermined CG object is specified. If a method of pointing one point of the CG image by a pointing device upon manipulation input is provided, operation becomes easy. The principle of obtaining the degree of inclination (−θ) from the texture coordinate and the screen coordinate will be described.

Figure 11A:
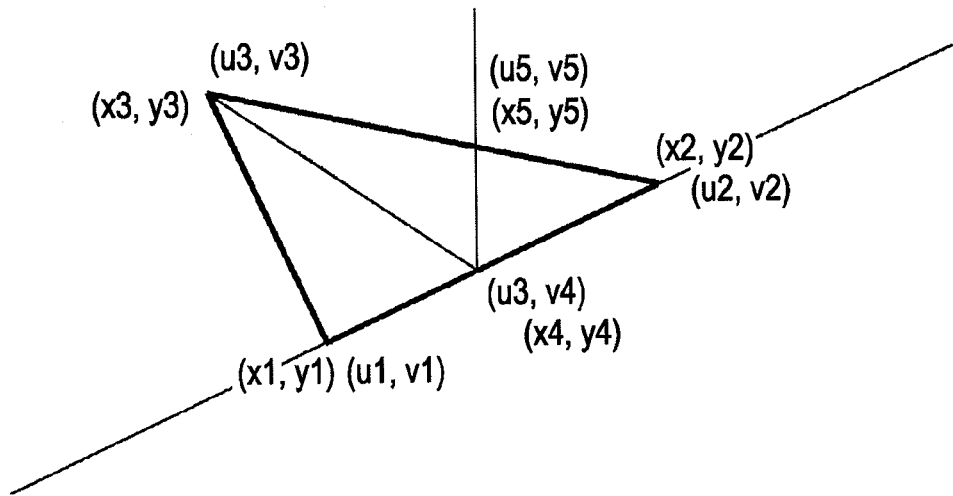
FIGS. 11A and 11B are diagrams for explaining the principle of obtaining the degree of inclination (−θ) from a texture coordinate and a screen coordinate.

FIG. 11A illustrates the polygon of a triangle to which the input image is texture-mapped. In the figure, (x1, y1), (x2, y2), and (x3, y3) are vertex coordinates of the polygon of a triangle, and (u1, v1), (u2, v2), and (u3, v3) are texture coordinates corresponding to the vertex coordinates.

Among the vertexes, for example, the vertex of which the value of v is the greatest will be paid attention. Here, the vertex of which the coordinate is (x3, y3) when it is assumed that v3>v1, and v3>v2 will be paid attention. Further, when the number of vertexes of which the value of v is the greatest is 2, the vertex of which the value of v is the smallest should be paid attention.

There is a point of which the u value is u3 on the straight line extending from the side of (x3, y3). In the figure, it is illustrated that the coordinate of this point is (x4, y4) and the corresponding texture coordinate is (u3, v4). In the figure, the point seems to be on this side but the point may not be on the side.

The line connected between the point of the coordinate (x3, y3) and to the point of the coordinate (x4, y4) is a perpendicular line of the texture coordinate. On the other hand, the perpendicular line in the xy coordinate system is the line connected between the point of the coordinate (x5, y5) and the point of the coordinate (x4, y4). The texture coordinate (u5, v5) for the coordinate (x5, y5) can be obtained by applying the ratio between vertexes to uv.

Figure 11B:
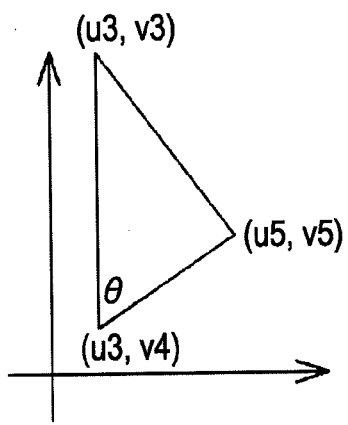

The uv coordinate value is expressed as illustrated in FIG. 11B if it is illustrated in the texture coordinate (space). To make sure that the perpendicular line of the texture coordinate agrees with the direction of the perpendicular line of the polygon, as clearly understood from the figure, the texture image should be rotated by −θ. By doing so, the degree of inclination (−θ) for making the texture image agree with the vertical direction of the screen is obtained from the vertex coordinates and the uv coordinate values (texture coordinates) of the specified polygon of a triangle. Since the shearing deformation is sometimes applied in the texture coordinate, the degree of inclination for aligning the verticality and the degree of inclination for aligning the horizontality are not identical.

For example, the manipulator can make the rotation angle of the image texture-mapped to the surface of the predetermined CG object agree with a desired rotation angle, for example, an angle of the erect posture by specifying the rotation angle of the image texture-mapped to the surface of the predetermined CG object. The specification of rotation angle can be applied together with the specification of zooming and the specification of shift. In general words, it can be said that an affine change is set.

Next, a CG animation will be described. In the case of the animation, appearance of the object to which the above-described input image is texture-mapped changes with time. For this instance, the specification of the rotation angle which is received by the coordinate setting unit 180 becomes the specification of the rotation angle of the input image texture-mapped to the surface of an object in a predetermined frame of the animation.

The CG animation is produced by prescribing the states of the CG (virtual three-dimensional space) at plural times (frames) on a time line. Each time (frame) is called a key frame (KF). In the time (frame) between a key frame and a key frame, the state of the CG is determined in a manner such that different parameters are interpolated at previous and subsequent key frames.

In the CG animation, the arrangement situation of the object which can become a point is frequently prescribed for the key frame. The reason of setting the middle of the interpolation to the desired state is that production of the CG animation is difficult. Accordingly, in the CG animation, in the case of performing the input by the coordinate setting unit 180, the intended image can be obtained by conducting the manipulation input at the key frame (KF) which becomes a point.

Figure 12A:
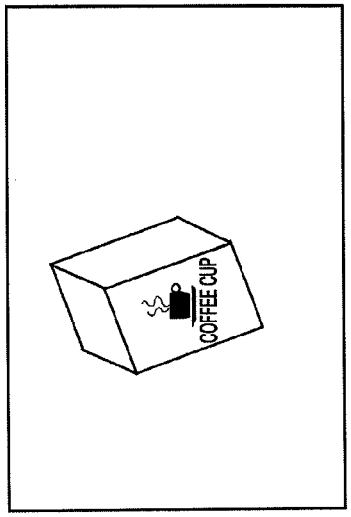
FIGS. 12A, 12B, 12C, and 12D are diagrams for explaining texture-mapping to a CG animation image.
Figure 12B:
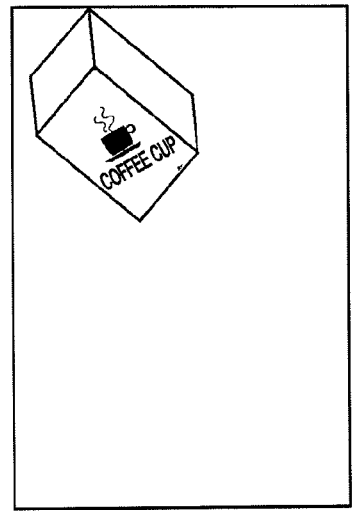
Figure 12C:
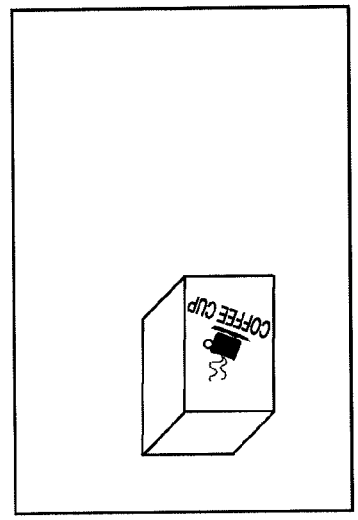
Figure 12D:
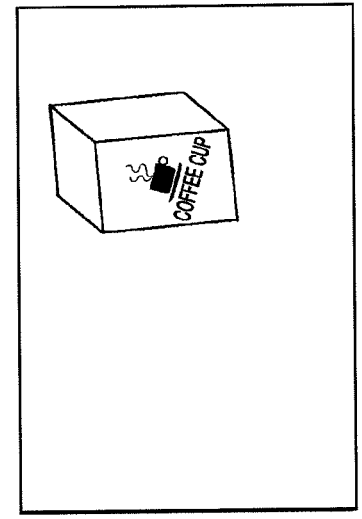

For example, it is assumed that times f1, f2, f3, and f4 illustrated in the figures are key frames in animations of FIGS. 12A to 12D. That is, among the times, it is assumed that the texture-mapped image is desired to be in the erect state in which y axis (direction of V coordinate) agrees with the vertical direction at the time f2. FIG. 12B exactly illustrates such a state.

The manipulator selects the key frame of time f2 and should specify so as to set the texture coordinate such that the texture-mapped image is in the erect state. For this reason, the following operation is performed according to the embodiment.

Figure 13:
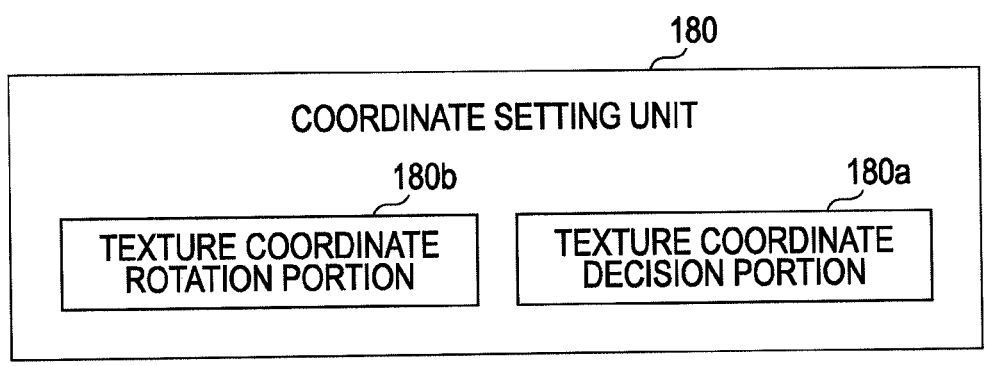
FIG. 13 illustrates an exemplary schematic block structure of functions of a coordinate setting unit.

FIG. 13 illustrates an example of the schematic block structure of functions of the coordinate setting unit 180. In other words, the coordinate setting unit 180 has a texture coordinate decision portion 180a and a texture coordinate rotation portion 180b. The texture coordinate decision portion 180a is a function of receiving a change manipulation of the texture coordinate from a manipulator. In addition, the texture coordinate rotation portion 180b is a function of converting the texture coordinate in response to the specification given by the manipulator.

When the manipulator inputs the specification of the rotation angle, the image mapping unit 150 performs the texture mapping by rotating the texture image. When the coordinate setting unit 180 has the texture coordinate rotation portion 180b as illustrated in FIG. 13, processing of rotating the texture coordinate is performed by the coordinate setting unit 180. However, the structure in which the coordinate setting unit 180 does not have the texture coordinate rotation portion 180b but has only the texture coordinate decision portion 180a can be considered. In the case, the image mapping unit 150 or other units may include the texture coordinate rotation portion therein.

Figure 14:
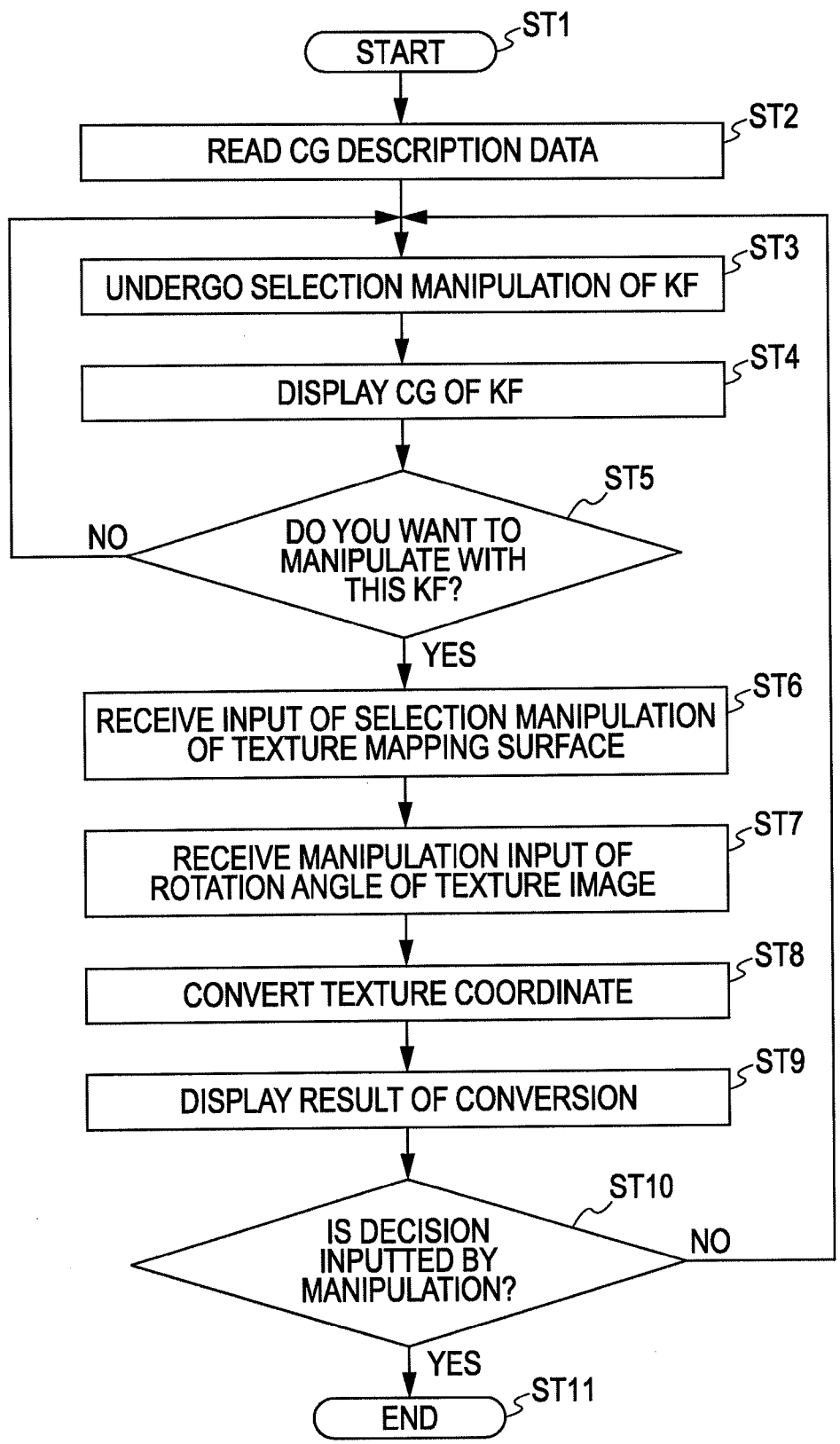
FIG. 14 is a flowchart illustrating the processing order of the coordinate setting unit.

The flow chart of FIG. 14 illustrates processing order of the coordinate setting unit 180 illustrated in FIG. 13.

The coordinate setting unit 180 starts processing in Step ST1 and then moves on to Step ST2. In Step ST2, the coordinate setting unit 180 reads the CG description data generated by the CG production unit 110. The CG description data has a plurality of key frames (KF).

Next, the coordinate setting unit 180 undergoes the selection manipulation of the key frames (KF) by the manipulator in Step ST3. So the time in the animation is specified. In Step ST4, the coordinate setting unit 180 displays the CG image of the key frame selected in Step ST3.

Next, the coordinate setting unit 180 judges whether to manipulate or not in the key frame displayed in Step ST3. The coordinate setting unit 180 judges it on the basis of the button manipulation of, for example, "key frame decision" or "cancellation". When the manipulator performs the button manipulation of "cancellation", the coordinate setting unit 180 returns to Step ST3. On the other hand, when the manipulator performs the button manipulation of "key frame decision", the coordinate setting portion 180a moves on to processing of Step ST6.

Figure 15:
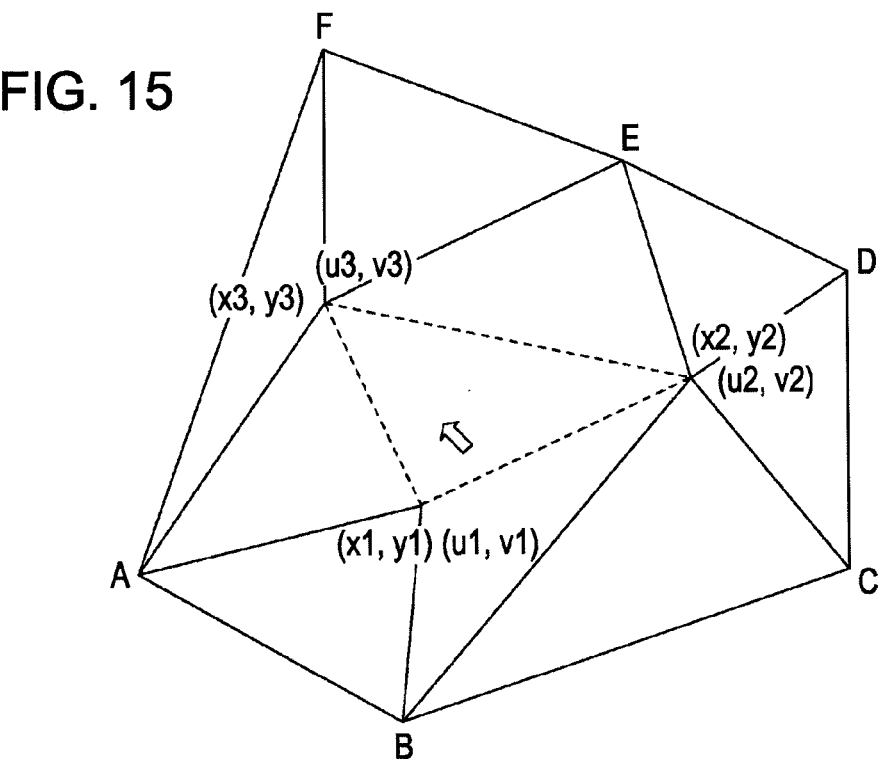
FIG. 15 is a diagram for explaining selection operation of a polygon of a triangle to make a texture image look up.

In Step ST6, the coordinate setting unit 180 receives the manipulation input selecting one out of a plurality of polygons of the displayed CG image. In general, as illustrated in FIG. 15, it functions to undergo a selection manipulation selecting one side out of a plurality of polygon sides of a mesh. The manipulator may simply specify one point of the side without considering the division of the polygon.

Next, in Step ST7, the coordinate setting unit 180 receives the manipulation input of the rotation angle of the texture image for the side selected in Step ST6. For example, it is ordered such that the direction of the V coordinate comes to agree with the direction of the y axis of coordinate. In Step ST8, the coordinate setting unit 180 obtains the degree of inclination ($-\theta$) on the basis of the manipulation input of, for example, selection of the polygon side or the rotation angle of the texture image and converts the texture coordinate (see FIG. 10). In this case, the object to be converted is texture coordinates of all of the vertexes belonging to the polygon mesh. As a result, the moving image mapped to the polygon mesh changes to be displayed in equally rotated or the like state.

Next, in Step ST9, the coordinate setting unit 180 displays the conversion result of the texture coordinate. Preferably the CG image to which texture mapping with the conversion is applied may be output from the image generation unit 140, and the state of the picture is provided to the manipulator to let the manipulator judge. In Step ST10, the coordinate setting unit 180 judges whether there is a manipulation input of a decision. In the case in which there is the manipulation input of a decision, decision is made in the processing and the processing ends in Step ST11.

On the other hand, when there is no manipulation input of a decision, the processing returns to Step ST3 and the above-described processing is repeated. In the case in which the surface to which the texture mapping is applied has a complex form, the result varies in response to which point of the side is specified. Accordingly, it is efficient to establish a manipulation method which can decide the point of the side after a process of trial and error.

By the above-mentioned function, the image texture-mapped at a desired frame in an animation becomes a desired state, for example, an erect state or the like, and the images texture-mapped at the other frames are pasted to the surface which is texture-mapped in response to movement of the CG in the animation. The desired display state at the desired frame and the movement united with the CG image can be established in parallel.

Exemplary Operation of Image Processing Device

An exemplary operation of the image processing device 100 illustrated in FIG. 1 will be described. In the CG production unit 110, the CG description data for generating the predetermined CG image is generated by the CG production software. As described above, the CG description data generated by the CG production unit 110 is sent to the image generation unit 140 and the surface specification unit 120 via the network 130.

In the surface specification unit (GUI) 120, the value (name) of an attribute given to the object of CG description data is assumed a choice, and the object which is the texture mapping object to which the input image is to be texture-mapped is specified by the manipulation of the manipulator. This specification information (the value of attribute) is sent to the image generation unit 140 from the surface specification unit 120.

The matrix switch 160 selectively outputs any piece of the image data which was input into 9 input lines as image data L for texture mapping by letting the manipulator push the push button line 171 of the image selection manipulation unit 170. The image data L for texture mapping obtained by the matrix switch 160 is sent to the image mapping unit 150.

The image generation unit 140 generates the CG image which is a three-dimensional space image on the basis of the CG description data produced by the CG production unit 110. As described above, the specification information of the object which is the texture mapping object is sent to the image generation unit 140 from the surface specification unit 120. The image mapping unit 150 is controlled such that the input image is texture-mapped to the surface of the texture mapping object by the image generation unit 140.

In the image mapping unit 150, the image based on the image data L obtained by the matrix switch 160 is texture-mapped to the surface of an object which is the texture mapping object by the control of the image generation unit 140. Image data Vout of the CG image which is the result obtained by texture-mapping the image based on the image data L to the surface of an object which is the texture mapping object is output to the output terminal 140a derived from the image generation unit 140.

In addition, change manipulation of the texture coordinate is accepted by the coordinate setting unit 180 and contents of the change manipulation are stored. For example, as the change manipulation, there is a zooming specification manipulation to perform the zooming (expansion, shrinkage) of the texture image to be mapped with the object. In addition, for example, as the change manipulation, there is a shift specification manipulation to shift (horizontally, vertically) the texture image to be mapped with the object. In addition, for example, as the change manipulation, there is a rotation angle specification manipulation to rotate the texture image to be mapped with the object.

When the change manipulation of the texture coordinate is accepted by the coordinate setting unit 180, the image mapping unit 150 performs the texture mapping of the input image (texture image) by the texture coordinate which is changed on the basis of the contents of the change manipulation. For example, the change of the texture coordinate is performed by the coordinate setting unit 180 or the image mapping unit 150.

For example, when there is the zooming specification manipulation, the texture mapping is performed by the texture coordinate which is changed such that the texture image (input image) texture-mapped to the surface of an object becomes the zoomed state. Therefore the input image texture-mapped to the surface of an object becomes the specified zoom state.

In addition, for example, when there is the shift specification manipulation, the texture mapping is performed by the texture coordinate which is changed such that the texture image (input image) texture-mapped to the surface of an object becomes the specified shifted state. Therefore, the input image texture-mapped to the surface of an object becomes the specified state.

Figure 16A:
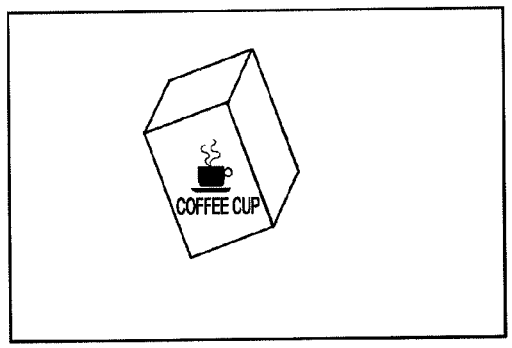
FIGS. 16A and 16B illustrate the texture mapping states of the CG image (with the change of the texture coordinate).
Figure 16B:
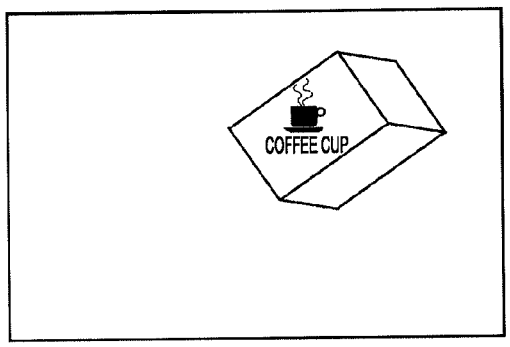

In addition, for example, when there is the rotation angle specification manipulation, the texture mapping is performed by the texture coordinate which is changed such that the texture image (input image) texture-mapped to the surface of an object is rotated by the specified rotation angle. Therefore, the input image texture-mapped to the surface of an object comes to the rotated state by the specified rotation angle as illustrated in FIGS. 16A and 16B and, for example, comes the erect state.

In the image processing device 100 illustrated in FIG. 1, the change manipulation (zooming specification manipulation, shift specification manipulation, rotation angle specification manipulation) of the texture coordinate by the manipulator is received and contents of the change manipulation are stored by the coordinate setting unit 180. In addition, the texture mapping is performed by the texture coordinate, which is changed on the basis of the contents of the change manipulation which are stored in the coordinate setting unit 180, by the image mapping unit 150 when the input image is texture-mapped to the surface of an object. Therefore, the manipulator can obtain the result of the texture mapping of the input image as he or she intended.

In addition, it is possible to use both of the CG obtained by texture-mapping the still picture at the time of CG production and the CG obtained by texture-mapping the input image (moving image) at the time of use, and plural results can be obtained by a single CG production by changing the texture coordinate only when texture-mapping the input image. Therefore, the efficiency is increased. For example, it can be used to express the surface of the CG object in the case of texture-mapping the still picture, and to decorate the moving image with CG in the case of texture-mapping the input image.

2. Modified Example

As illustrated in FIG. 1, the coordinate setting unit 180 and the image generation unit 140 are integrally formed with each other in the image processing device 100. In addition, the CG description data generated in the CG production unit 110 is sent to the image generation unit 140 via the network 130, and stored in the image generation unit 140.

Figure 17:
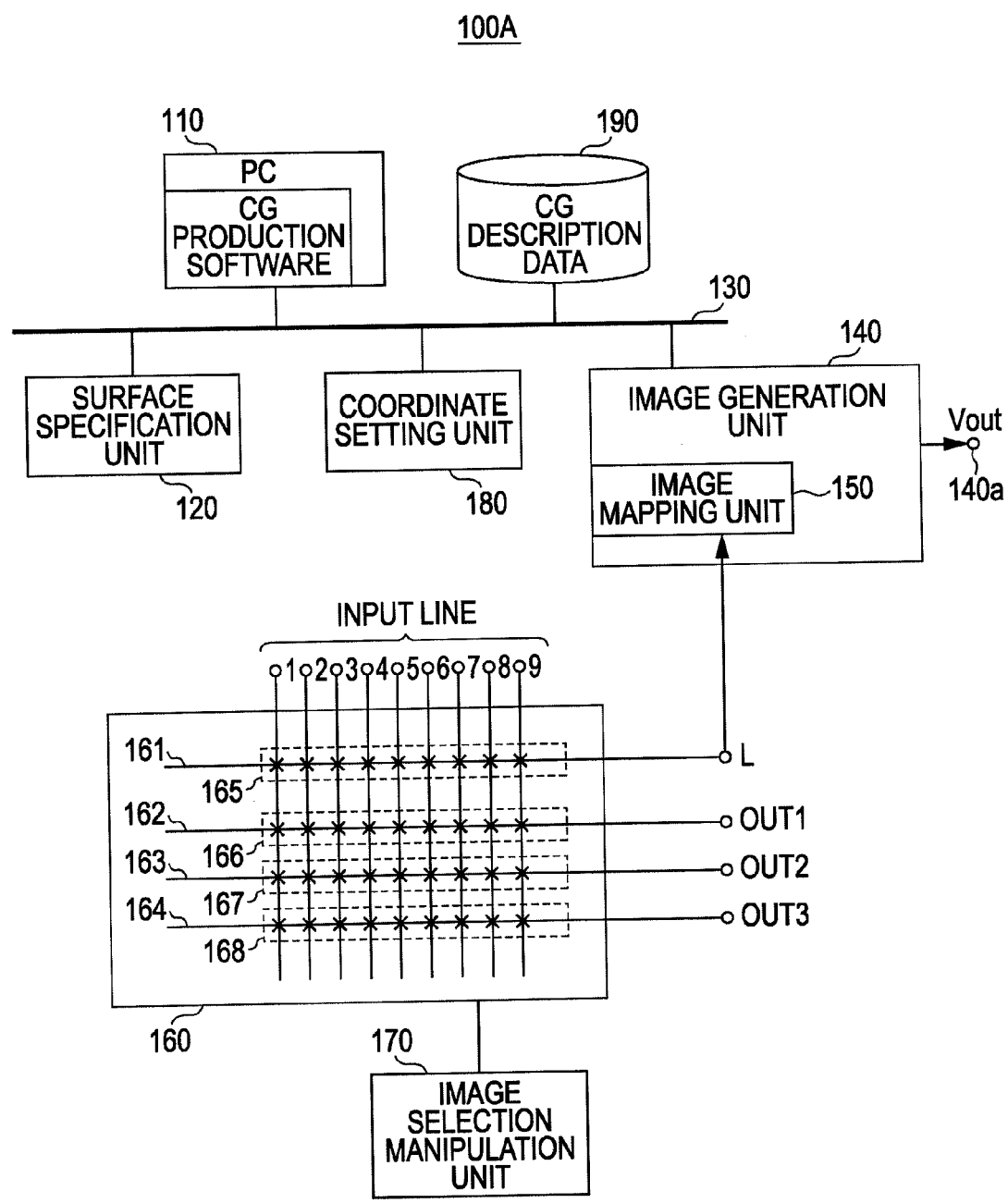
FIG. 17 is a block diagram illustrating an image processing device according to a modified example.
Figure 18A:
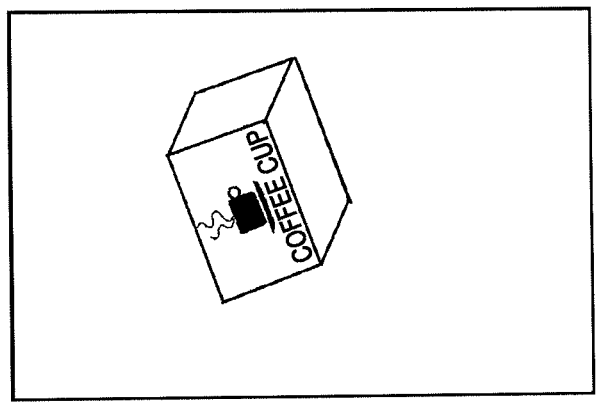
FIGS. 18A and 18B illustrate the texture mapping states to the CG image (without change of the texture coordinate).
Figure 18B:
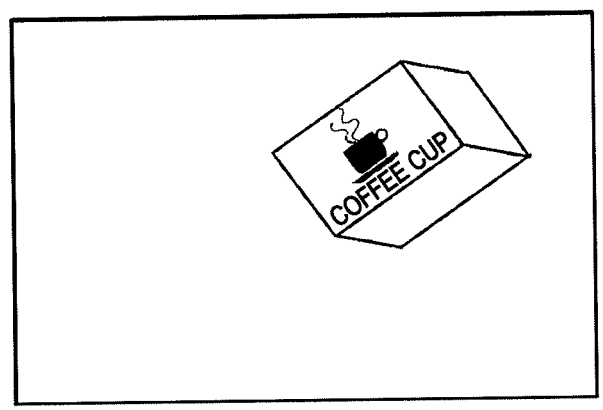

FIG. 17 illustrates an image processing device 100A which is a modified form of the image processing device 100 illustrated in FIG. 1. In FIG. 16, portions equivalent to elements illustrated in FIG. 1 are denoted by like references and the detailed description on such portions is omitted.

In the image processing device 100A, the coordinate setting unit 180 is provided separately from the image generation unit 140, and connected to the image generation unit 140 via the network 130. In addition, in the image processing device 100A, a data storage unit 190 storing the CG description data generated by the CG production unit 110 is connected to the network 130. When generating the CG image, the image generation unit 140 uses the CG description data by reading it from the data storage unit 190.

In addition, although the detailed description is omitted, others in the image processing device 100A illustrated in FIG. 17 are structured in the same manner as in the image processing device 100 illustrated in FIG. 1 and work likewise.

Another Modified Example

In an animation, it is possible to receive the specification of the time other than the key frame in the animation, store the change manipulation of the texture coordinate by activating the coordinate setting unit as in the above example while outputting the CG image at the time can be used, and make the image mapping unit 150 use it.

In the above example, a single kind of change of the texture coordinate is stored for the CG description data. However, the coordinate setting unit may store plural changes and let the manipulator select one of those so that the image mapping unit 150 uses the selected one.

Furthermore, storage areas are provided in the coordinate setting unit so as to correspond to the input lines, respectively which are selected by the cross point switch group 165, and the changes are read from the storage areas in response to (number of) the input lines selected by the cross point switch group 165 and may be used in the image mapping unit 150.

In addition, in the case in which there is a plurality of image mapping units, storage areas of the coordinate setting unit are provided so as to correspond to them, respectively. Alternatively, the image mapping unit can use the storage areas correlating with the input lines selected by the cross point switch group which supplies an image to each of the storage areas.

The present application contains subject matter related to that disclosed in Japanese Priority Patent Application JP 2009-166178 filed in the Japan Patent Office on Jul. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

APPENDIX

Sample of Collada File
<library_materials>
<material id="OlMatDefault" name="OlMatDefault"> Definition of a material
<instance_effect url="#OllvlatDefaul t-fx"/> Refer to an effect
</material>
</library_materials>
<library_effects>
<effect id="OlMatDefault-fx"name="OlMatDefault"> This is the contents of the material
<profile_COMMON>
<technique_sid="standard">
<phong>
<emission>
<color sid="emission">O.OOOOOO 0.000000 0.0000001.000000</color>
</emission>
<ambient> Here, colors are added
<color sid="ambient">0.588235 0.952941 0.9215691.000000</color>
</ambient>
<diffuse>
<color sid="diffuse">0.588235 0.952941 0.9215691.000000</color>
</diffuse>
<specular>
<color sid="specular">0.000000 0.000000 0.0000001.000000</color>
</specular>
<shininess>
<float sid="shininess">2.000000</float>
</shininess>
<reflective>
<color sid="reflective">0.000000 0.000000 0.0000001.000000</color>
</reflective>
<reflectivity>
<float sid="reflectivity">1.000000</float>
</reflectivity>
<transparent>
<color sid="transparent">1.000000 1.000000 1.0000001.000000</color>
</transparent>
<transparency>
<float sid="transparency">0.000000</float>
</transparency>
</phong>
</technique>
</profile_COMMON>
</effect>
</library_effects>
<library_geometries>
<geometry id="Box01-lib" name="Box01Mesh">
<mesh>
<source id="Box01-lib-Position">
<float_array id="Box01-lib-Position-array"count="24">
Arrangement of position information
−4.673016−8.585480 0.000000
4.673016−8.585480 0.000000
−4.6730168.585480 0.000000
4.6730168.585480 0.000000
4.673016−8.585480 10.185543
4.673016−8.585480 10.185543
−4.6730168.585480 10.185543
4.6730168.585480 10.185543
</float_array>
<technique_common>
<accessor source="#Box01-lib-Position-array" count="8"stride="3">
<param name="X" type="float"/> Description on arrangement of position information
<param name="Y"="float"/>
<param name="Z" type="float"/>
</accessor>
</technique_common>
</source>
<source id="BoxOl-lib-UVO">
<float_array id="Box01-lib-iT\10-array; count="24">
arrangement of UV coordinates
0.0000000.000000 There is only 0 and 1 because it is a simple cube
1.0000000.000000
0.0000001.000000
1.0000001.000000
0.0000000.000000
1.0000000.000000
0.0000001.000000
1.0000001.000000
0.0000000.000000
1.0000000.000000
0.0000001.000000
1.0000001.000000
</float_array>
<technique_common>
<accessor source="#Box01-lib-UVO-array" count="12"stride="2">

Description of UV coordinate
<param name="S" type="float"/>
<param name="T" type="float"/>
</accessor>
</technique_common>
</source>
<vertices id="Box01-lib-Vertex">
<input semantic="POSITION"source="#Box02-lib-Position"/>
</vertices>
<polygons material="01MatDefault" count="12">
<input semantic="VERTEX" offset="0"source="#Box01-libVertex"I>
<input semantic="NORMAL" offset="1"source="#Box01-lib-Normal0"/>
<input semantic="TEXCOORD" offset="2" set="O"source="#Box0llib-UV0"/>
<p>O 0 9 2 1 11 3 2 10</p> Vertex information
<p>3 3 10 1 4 8 0 5 9</p>
<p>4 6 8 5 7 9 7 8 11</p>
<p>7 9 11 6 10 10 4 11 8</p>
<p>O 12 4 1 13 5 5 14 7</p>
<p>5 15 7 416 6 0 17 4</p>
<p>l 18 0 3 19 1 7 20 3</p>
<p>7 21 3 5 22 2 1 23 O</p>
<p>3 24 4 2 25 5 6 26 7</p>
<p>6 27 7 7 28 6 3 29 4</p>
<p>2 30 0 0 31 1 4 32 3</p>
<p>4 33 3 6 34 2 2 35 O</p>
</polygons>
</mesh>
</geometry>
</library_geometries>
<library_animtions>
<animation id="BoxOl-anim" name="BoxOl">
<animation>
<source id="Box01-translate-animation-inputx">
<float_array id="BoxOl-translate-animation-inputX-array-"count="4">
0.0000001.000000 1.033333 1.333333 Time of change of an x coordinate value in an animation
</float_array>
<technique_common>
<accessor source="#Box01-translate-animation-inputXarray" count="4">
<paramname="TIME" type="float"/>
</accessor>
</technique_common>
</source>
<source id="Box01-translate-animation-outputX">
<float_array id="Box01-translate-animation-outputXarray" count="4">
−43.404125−43.404125−23.897228 13.150181
x coordinate values of an animation
</float_array>
<technique_common>
<accessor source="#BoxOl-translate-animation-outputxarray" count="4">
<param name="X" type="float"/>
</accessor>
</technique_common>
</source>
<source id="Box01-tratzslate-animation-intanX">
<float_array id="Box01-translate-animation-intanXarray" count="4">
0.0000000.000000 1.884578 −0.000000
</float_array>
<technique_common>
<accessor source="#Box01-translate-animation-intanXarray" count="4">
<param name="X" type="float"/>
</accessor>
</technique_common>
</source>
<source id="Box01-translate-animation-outtanX">
<float_array id="Box01-translate-animation-outtanXarray" count="4">
0.0000000.000000 16.961202 0.000000
</float_array>
<technique_common>
<accessor source="#BoxOl-translate-animation-outtanXarray" count="4">
<param name="X" type="float"/>
</accessor>
</technique_common>
</source>
<source id="Box01-translate-animation-interpolationx">
<Name_array id="BoxOl-translate-animation-interpolation-xarrav" count="4"> BEZIER BEZIER BEZIER BEZIER
</Name_array>
<technique_common>
<accessor source="#BoxOl-translate-animation-interpolationXarray" count="4">
<param type="name"/>
</accessor>
</technique_common>
</source>
<sampler id="BoxOl-translate-animationX">
<input semantic="INPUT"source="#BoxOl-translate-animationinputX"/>
<input semantic="OUTPUT" source="#BoxOl-translate-animationoutputX"/>
<input semantic="IN TANGENT"source="#BoxOl-translateanimation-intanx"/>
<input semantic="OUT TANGENT"source="#BoxOl-translateanimation-outtanX"/>
<input semantic="INTERPOLATION" source="#BoxOl-translateanimation-inte rpolationX"></sampler>
<channel source="#BoxOl-translateanimationX" target="BoxOl/translate.X"/>
Here is a determination (target) of what animation information the above is.
</animation>
<library_visual_scenes>
<visual_scene id="RootNode" name="RootNode">
<node id="Box01" name="Box01">
<translate sid="translate">−43.404125 0.6970370.000000</translate>
<rotate sid="rotateZ">O 0 1 O.OOOOOO</rotate>
<rotate sid="rotateY">O 1 0 O.OOOOOO</rotate>
<rotate sid="rotateX">l 0 0 O.OOOOOO</rotate>
<scale sid="scale">1.000000 1.000000 1.000000</scale>
<instance_geometry url="#Box01-lib">
geometric information definition
<bind_material>
<technique_common>
Refer to
<instance_material
symbol="OlMatDefault"target="#OlMatDefault"/>
Refer to material
</technique_common>
</bind_material>
</instance_geometry>
</node>
</visual_scene>
<//library_visual_scenes>

What is claimed is:

1. An image processing device comprising:
   an image generation unit that generates a computer graphics object based on computer graphics description data;
   an image mapping unit that performs texture-mapping of an input image to a surface of the generated computer graphics object; and
   a coordinate setting unit that receives a change manipulation for the input image and store contents of the change manipulation, wherein the image mapping unit performs texture mapping using the texture coordinates which are calculated on the basis of the stored contents of the change manipulation when texture-mapping the input image to the surface of the computer graphics object,
   wherein the coordinate setting unit receives a specification of zooming as the change manipulation of the input image in a range [a, b], wherein the image mapping unit performs the texture mapping using the texture coordinates calculated based on the equation:

$$u2=(b-a)*u1+a; \text{ and}$$

$$v2=(b-a)*v1+a;$$

wherein u1 and v1 are original texture co-ordinates and u2 and v2 are the calculated texture co-ordinates based on the change manipulation, and wherein "a" and "b" are in the range of 0 to 1.

2. The image processing device according to claim 1, wherein the coordinate setting unit receives a specification of a rotation angle of the input image to be texture-mapped to the surface of the computer graphics object and stores contents of the specification of the rotation angle, and wherein the image mapping unit performs texture mapping by the texture coordinates which are calculated such that the input image to be texture-mapped to the surface of the object is rotated by the specified rotation angle on the basis of the stored contents of the specification when texture-mapping the input image to the surface of the computer graphics object.

3. The image processing device according to claim 2, wherein the computer graphics description data contains an animation, and the specification of the rotation angle received by the coordinate setting unit is a specification of the rotation angle of the input image to be texture-mapped to the surface of the object at a predetermined frame within the animation.

4. The image processing device according to claim 1, wherein the coordinate setting unit receives a specification of zooming of the input image to be texture-mapped to the surface of the computer graphics object, and stores the contents of the specification of the zooming, and wherein the image mapping unit performs texture mapping by a texture coordinates which are calculated such that the input image to be texture-mapped to the surface of the computer graphics object is rescaled based on the specified zooming on the basis of the stored contents of the specification when texture-mapping the input image to the surface of the computer graphics object.

5. The image processing device according to claim 1, wherein the coordinate setting unit receives a specification of shift of the input image to be texture-mapped to the surface of the computer graphics object and stores contents of the specification of shift, and wherein the image mapping unit performs texture mapping by a texture coordinates which are calculated such that the input image to be texture-mapped to the surface of the computer graphics object is shifted based on the specified shift on the basis of contents of the specification stored in the coordinate setting unit when texture-mapping the input image to the surface of the computer graphics object.

6. The image processing device of claim 1, further comprising a specification unit to provide specification information on the computer graphics object by which texture mapping of the input image is performed.

7. The image processing device of claim 1, further comprising a texture coordinate decision portion and a texture coordinate rotation portion, wherein the texture coordinate decision portion receives the change manipulation of the texture coordinate from a manipulator, wherein the manipulator specifies one or more changes to the input image.

8. The image processing device of claim 1, wherein the coordinate setting unit displays the change in the texture coordinate of the computer graphics object.

9. The image processing device of claim 1, wherein the coordinate setting unit stores a plurality of changes, and wherein a manipulator selects one of the plurality of changes for the texture mapping.

10. An image processing method comprising:
    in an image processing device comprising one or more processors:
    generating a computer graphics object on the basis of computer graphics description data;
    texture-mapping an input image to a surface of the computer graphics object; and
    receiving a manipulation of a change for the input image and storing contents of the change manipulation, wherein when texture-mapping the input image to the surface of the computer graphics object, the texture mapping is performed by the texture coordinates which are calculated on the basis of the stored contents of the change manipulation,
    wherein the one or more processors receive a specification of zooming as the change manipulation of the input image in a range [a, b], wherein the one or more processors perform the texture mapping by the texture coordinates calculated based on the equation:

$$u2=(b-a)*u1+a; \text{ and}$$

$$v2=(b-a)*v1+a;$$

wherein u1 and v1 are original texture co-ordinates and u2 and v2 are the calculated texture co-ordinates based on the change manipulation, and wherein a and b are outside the range of 0 to 1.

* * * * *